Oct. 2, 1951     E. E. PACKARD     2,569,826
RIVET
Filed May 17, 1948
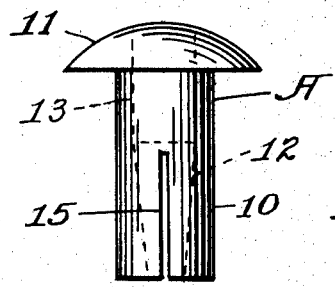
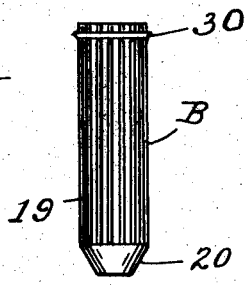
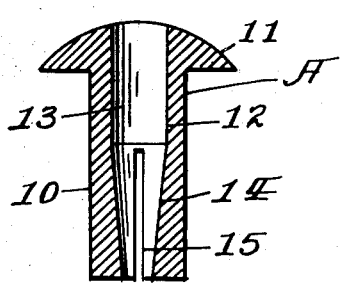
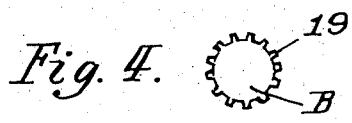
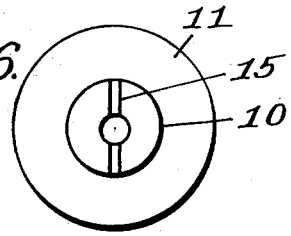
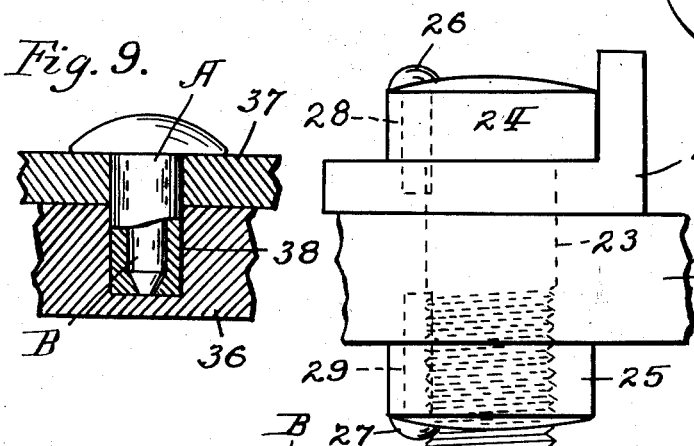
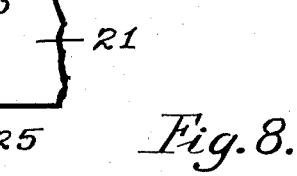
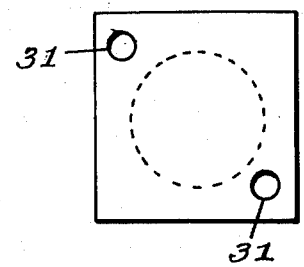
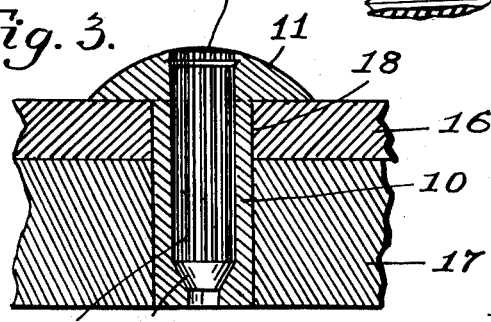
INVENTOR.
Elon E. Packard.
BY
Attorney.

Patented Oct. 2, 1951

2,569,826

UNITED STATES PATENT OFFICE 2,569,826

RIVET

Elon E. Packard, Los Angeles, Calif.

Application May 17, 1948, Serial No. 27,591

2 Claims. (Cl. 85—40)

This invention relates to improvements in rivets of that type which while in cold condition can be applied in use in a rivet receiving hole for fastening thicknesses of material together or for holding nuts, bolts, retainers and other objects in place, said rivet being firmly set by an expander pin which is driven into the rivet and forms an interlocking connection therewith.

The primary object of my invention is the production of a rivet of its kind which avoids the usual upsetting and swaging of a protruding end portion of the rivet, thus providing a joint without the usual upset end of the rivet projecting. A further object is maximum simplicity of construction and increased effectiveness in use. In the following specification further objects and advantages will be set forth.

In the accompanying drawing forming part of this specification, Fig. 1 is a side elevation of one form of my improved rivet body without the expander pin therein; Fig. 2 is a side elevation of the expander pin which is used with the rivet body; Fig. 3 is a section showing my improved rivet applied in use for fastening two pieces of material together; Fig. 4 is a top end view of the expander pin; Fig. 5 is a longitudinal central section of the rivet body; Fig. 6 is a bottom end view of the rivet body; Fig. 7 is a side elevation partly in section illustrating two of my improved rivets applied to the head of a bolt and a bolt retainer, and for holding a nut in place on work material, both applied uses being adapted to keep the bolt and nut from turning; Fig. 8 is a plan of the nut or bolt head shown in Fig. 7, as the case may be before the rivet is applied, and Fig. 9 is a part sectional view showing the application of my improved rivet for fastening two work members together, when the rivet receiving hole does not penetrate the exposed surface of the back thickness of work material.

In accordance with my invention, the rivet body A is hollow and has a tubular stem 10, a head 11 and a longitudinal bore 12 through the stem and head. The upper end portion 13 of the bore is normally of even diameter for a short distance inwardly through the head and entering the upper portion of the stem, and is tapered at 14 for the remaining distance longitudinally through the stem as shown in Fig. 5. The diameter of the partly straight and partly tapered bore in the rivet is proportioned according to the outside diameter of the stem so as to produce a wall of desired thickness and strength. The stem has a transverse slot 15 extending lengthwise a considerable length thereof (Fig. 1), through its end opposite the head, to permit ready expansion of the stem as hereinafter described. The head 11 of the rivet may be of any desired shape, that shown for illustration being of circular shape.

In use for fastening thicknesses of work material together, such as 16 and 17 (Fig. 3), a hole 18 of substantially even diameter corresponding with the normal diameter of the stem 10 is first drilled through or into said work material. A rivet having its stem of slightly less length than the total thickness of the material to be fastened may be employed, said stem being of substantially even outside diameter to match the diameter of the hole. The stem of the rivet is then inserted in the hole and a hard metal pin B, which corresponds in outer diameter throughout its length with the inner diameter of the upper end portion of the rivet body is driven downwardly by a set or hammer into the tapering passage of the stem, thus expanding the stem and causing it to tightly grip the material in which the rivet is applied.

The rivet expanding pin has an abrupt taper 20 at its bottom end which acts as a wedge when the pin is driven home in the rivet body, and as it encounters the tapered inner wall of the rivet it gradually and firmly swells the rivet body (Fig. 3), into an even engaging fit in the hole in which the rivet has been applied, thereby causing the thicknesses of work material to be joined together securely below the head. The normal width of slot 15 compensates for the over plus material exuded by the driving force of the pin. The result is a substantially smooth exposed surface on the lower member of work material which is joined by the rivet without any protruding unevenness by the work material caused by the driving pin.

My improved rivet is adapted for unrestricted riveting purposes and by slight modification in extended length it can be quickly applied as a bolt and nut retainer or for fastening various objects together without the use of mechanical devices other than a hammer.

In Fig. 7 a bolt is shown secured through a supporting member 21 and a bolt retainer 22, the shank 23 of said bolt having the usual head 24 and fastening nut 25, the latter being threadedly engaged on said shank and cooperating with the head to clamp the retainer and support 21 together. The head 24 is shown locked on the retainer by one of my improved rivets 26, and the nut 25 is shown locked on said support by another of my improved rivets 27. The rivet receiving hole 28 penetrates the head of the bolt and enters the retainer, and the rivet receiving hole 29 penetrates the nut and enters the support 21. My improved rivets 26 and 27 have stems of extended length and corresponding stem expanding pins such as B of substantially similar length which serves to lock the head 24 of the bolt on the retainer 22 and the nut 25 on said support 21. In this manner my improved rivets are adapted to retard either the bolt or the nut from turning.

In Fig. 9 the rivet A is shown applied in use for fastening two thicknesses of work members 36 and 37 together. In this instance the rivet receiving hole 38 does not fully penetrate the work members, thus leaving an uninterrupted exposed back surface on member 36 and producing a blind riveting effect. This construction has distinct advantages for various applications in use and my improved rivet is fully effective for fastening the work members together.

The rivet stem expanding pin B may be effectively composed of hardened steel or other metal and the body of the rivet may be composed of softer malleable and ductile metal. The side surface of said pin is serrated or ribbed longitudinally at 19, or knurled or roughened to increase the binding or locking effect between the rivet expanding pin and the bore of the rivet body and to prevent the pin from revolving and working loose after it has been driven home through the head and into the tapering bore. The ribbed surface 19 is shown in Figs. 2, 3 and 4. The wedging action of the rivet expanding pin which is driven into the tapered bore of the rivet body causes the rivet body to swell and expand laterally sufficiently to form an extremely tight and secure bond with the material in which the rivet is secured, whereby the rivet will not become dislodged or loosened through ordinary vibration and use. On the other hand the rivet can be readily removed from the work material by first driving the pin out of the rivet stem and by subsequently driving the stem of the rivet out of the material in which it has been secured. The slot 15 in the hollow stem of the rivet and the tapered bore 14, imparts flexibility to the stem and increases gripping action of the stem in the material in which the rivet is seated. Said slot also provides space to receive the expanded metal from the stem into interlocking connection with the pin.

When desired an annular ferrule 30 may be either formed or attached on the upper end portion of the rivet expanding pin, which is adapted to engage the wall of the hole in which the rivet body is inserted to additionally prevent the pin from working loose.

The plan view of the nut or bolt head illustrated in Fig. 8 shows two rivet receiving holes 31 disposed diagonally opposite each other so that either hole is available by a half turn for receiving one of the rivets when the bolt or its nut is turned. This feature simplifies reapplying nuts that have previously had a retainer rivet as it requires only a one-half turn of the nut or bolt head to again line up the holes after tightening either member.

Various other modifications in construction are contemplated within the spirit of the invention and the scope of the following claims.

I claim:

1. In an expansible rivet, adapted to extend through alined rivet receiving openings in workpieces to be connected in shear relation, comprising a shank of a length substantially equal to the combined thickness of the workpieces, a head on one end of said shank to form a stop when the shank is snugly received in the bores of the workpieces, said shank and head being provided with a central bore which is formed cylindrical from the tail end of said rivet to a point intermediate the ends of the shank and terminating in a conical bore for the remainder of the shank length converging in a direction opposite to said head end, said shank being diametrally and longitudinally split in a direction from the end opposite said head end to a point intermediate the length of the shank extending substantially the full length of the conical bore portion, an expansion pin of a diameter to permit the same to be snugly received in the cylindrical portion of the shank bore and adapted to be driven into the conical portion to expand the same into frictional locking engagement with the walls of said rivet receiving openings, said pin being provided with a tapered end portion of a greater taper angle than said conical portion to co-act therewith and expand the shank beyond its nominal size, and a locking ring on said pin spaced from the other end thereof adapted to be imbedded in the cylindrical bore of said rivet to prevent the pin from working loose.

2. In an expansible rivet for connecting plate-like workpieces in shear relation, comprising a shank of a length substantially equal to the total thickness of said plate-like workpieces having a head at one end, the shank of said rivet being of a nominal size to permit the same to be snugly received in alined rivet receiving openings in said workpieces, said shank and head being provided with a central bore having a cylindrical portion at the head and extending into the shank a distance of approximately one-third of the shank length, the remaining portion of said central bore being tapered inwardly for the remainder of the shank length to provide straight and conical bore areas with the conical bore area extending a distance substantially equal to one-half of the length of the rivet, the shank of said rivet being split diametrically and longitudinally inward from the end opposite the head end and throughout the entire length of the conical bore area, an expansion pin having a conical end portion of a greater taper angle than the conical bore area adapted to be snugly received in the cylindrical bore to properly position the same while the pin is being driven into the conical bore to expand the shank into frictional locking engagement with the internal walls of the rivet receiving openings in said plate-like workpieces, the conical end of said pin being adapted to expand and deform the metal of the shank in the area of the conical bore portion to expand the shank of the rivet, said pin being provided with longitudinally extending ribs arranged in circumferentially spaced apart relation to provide a series of mutually engaging friction surfaces with the bore in said shank and a locking ring on the other end of the pin in spaced relation from the end thereof adapted to frictionally lock the pin against longitudinal displacement in the cylindrical bore portion of said rivet and prevent said pin from working loose.

ELON E. PACKARD.

REFERENCES CITED

The following references are of record in the file of this patent:

UNITED STATES PATENTS

| Number | Name | Date |
| --- | --- | --- |
| 547,988 | Bull | Oct. 15, 1895 |
| 1,643,771 | Iseman | Sept. 27, 1927 |
| 2,057,648 | Kiefner | Oct. 13, 1936 |
| 2,264,747 | Fether | Dec. 2, 1941 |
| 2,292,467 | Norsell | Aug. 11, 1942 |
| 2,344,717 | Mills | Mar. 21, 1944 |
| 2,355,439 | Horton | Aug. 8, 1944 |